United States Patent [19]

Amini et al.

[11] Patent Number: 5,396,602
[45] Date of Patent: Mar. 7, 1995

[54] ARBITRATION LOGIC FOR MULTIPLE BUS COMPUTER SYSTEM

[75] Inventors: Nader Amini, Boca Raton; Patrick M. Bland, Delray Beach; Bechara F. Boury, Boca Raton; Richard G. Hofmann, Boynton Beach; Terence J. Lohman, Boca Raton, all of Fla.

[73] Assignee: International Business Machines Corp., Armonk, N.Y.

[21] Appl. No.: 69,253

[22] Filed: May 28, 1993

[51] Int. Cl.⁶ .......................................... G06F 13/362
[52] U.S. Cl. .................... 395/325; 370/85.2; 364/242.6; 364/242.92; 364/242.9; 364/238.3; 364/240; 364/240.2; 364/DIG. 1
[58] Field of Search ............... 395/325, 275, 425, 725; 340/825.5; 370/85.2

[56] References Cited

U.S. PATENT DOCUMENTS

| | | | |
|---|---|---|---|
| 4,442,504 | 4/1984 | Dummermuth et al. | 395/725 |
| 4,628,447 | 12/1986 | Carteret et al. | 395/725 |
| 4,890,224 | 12/1989 | Fremont | 395/325 |
| 5,083,259 | 1/1992 | Maresh et al. | 395/325 |
| 5,101,478 | 3/1992 | Fu et al. | 395/275 |
| 5,239,631 | 8/1993 | Bowry et al. | 395/325 |
| 5,253,348 | 10/1993 | Scalise | 395/325 |
| 5,265,211 | 11/1993 | Amini et al. | 395/325 |
| 5,276,845 | 1/1994 | Takayama | 395/425 |
| 5,297,260 | 3/1994 | Kametani | 395/325 |
| 5,297,292 | 3/1994 | Morimoto et al. | 395/725 |

Primary Examiner—Gopal C. Ray
Attorney, Agent, or Firm—Robert S. Babayi

[57] ABSTRACT

An arbitration mechanism is provided for use in a computer system which comprises (i) a central processing unit (CPU); (ii) a first system bus which connects the CPU to system memory so that the CPU can read data from, and write data to, the system memory; (iii) a second system bus connected to the CPU; (iv) a host bridge connecting the second system bus to a peripheral bus, the peripheral bus having at least one peripheral device attached thereto; and (v) an input/output (I/O) bridge connecting the peripheral bus to a standard I/O bus, the standard I/O bus having a plurality of standard I/O devices attached thereto. The arbitration mechanism comprises (i) a first level of logic for arbitrating between the plurality of standard I/O devices, wherein one standard I/O device is selected from a plurality of the standard I/O devices competing for access to the standard I/O bus, and (ii) a second level of logic for arbitrating between the selected standard I/O device, the CPU and the at least one peripheral device, wherein one of the selected standard I/O device, the CPU and the at least one peripheral device is selected to access the peripheral bus. The arbitration mechanism includes sideband signals which connect the first and second levels of arbitration logic and include arbitration identification information corresponding to the selected standard I/O device.

20 Claims, 12 Drawing Sheets

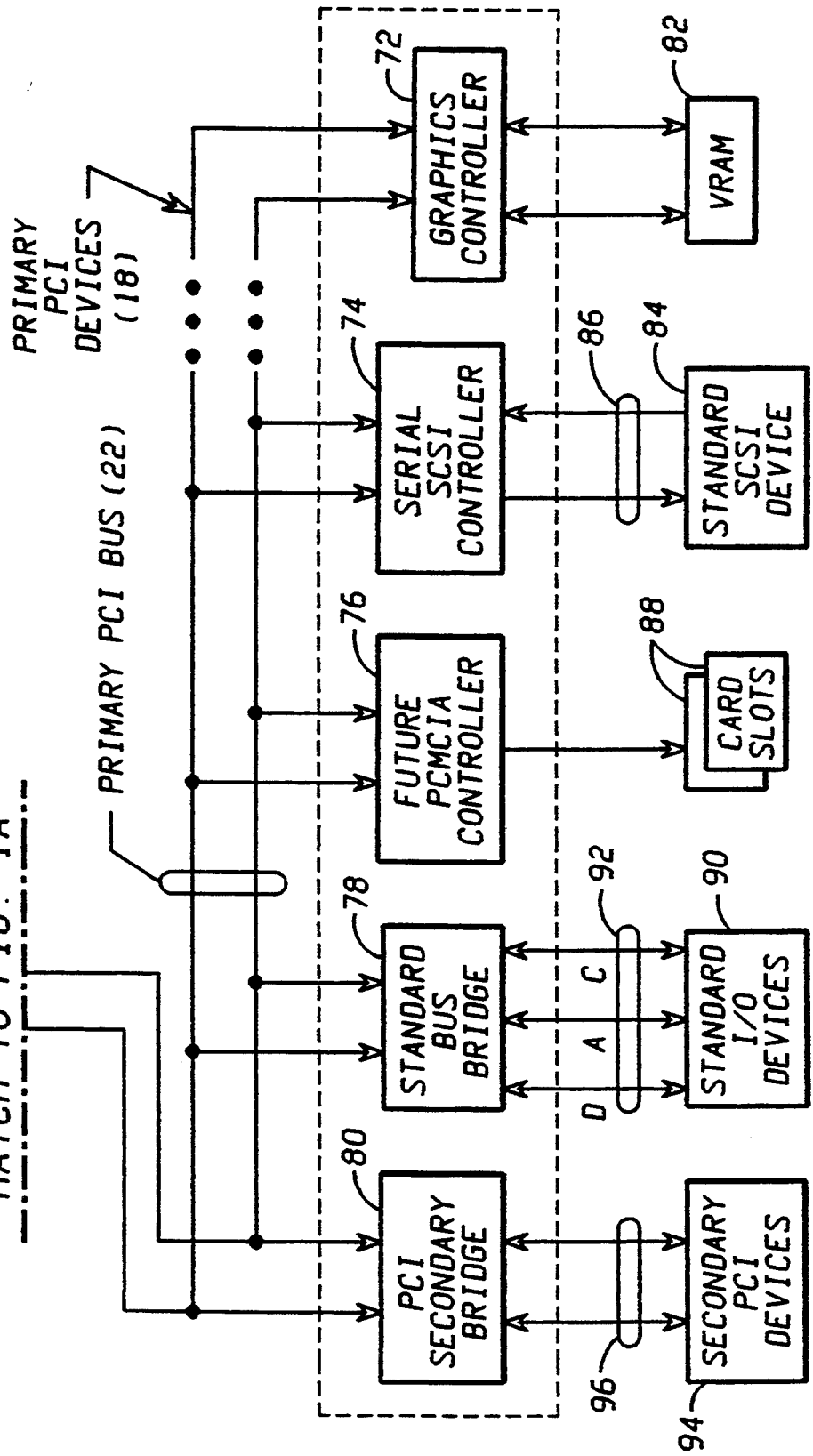

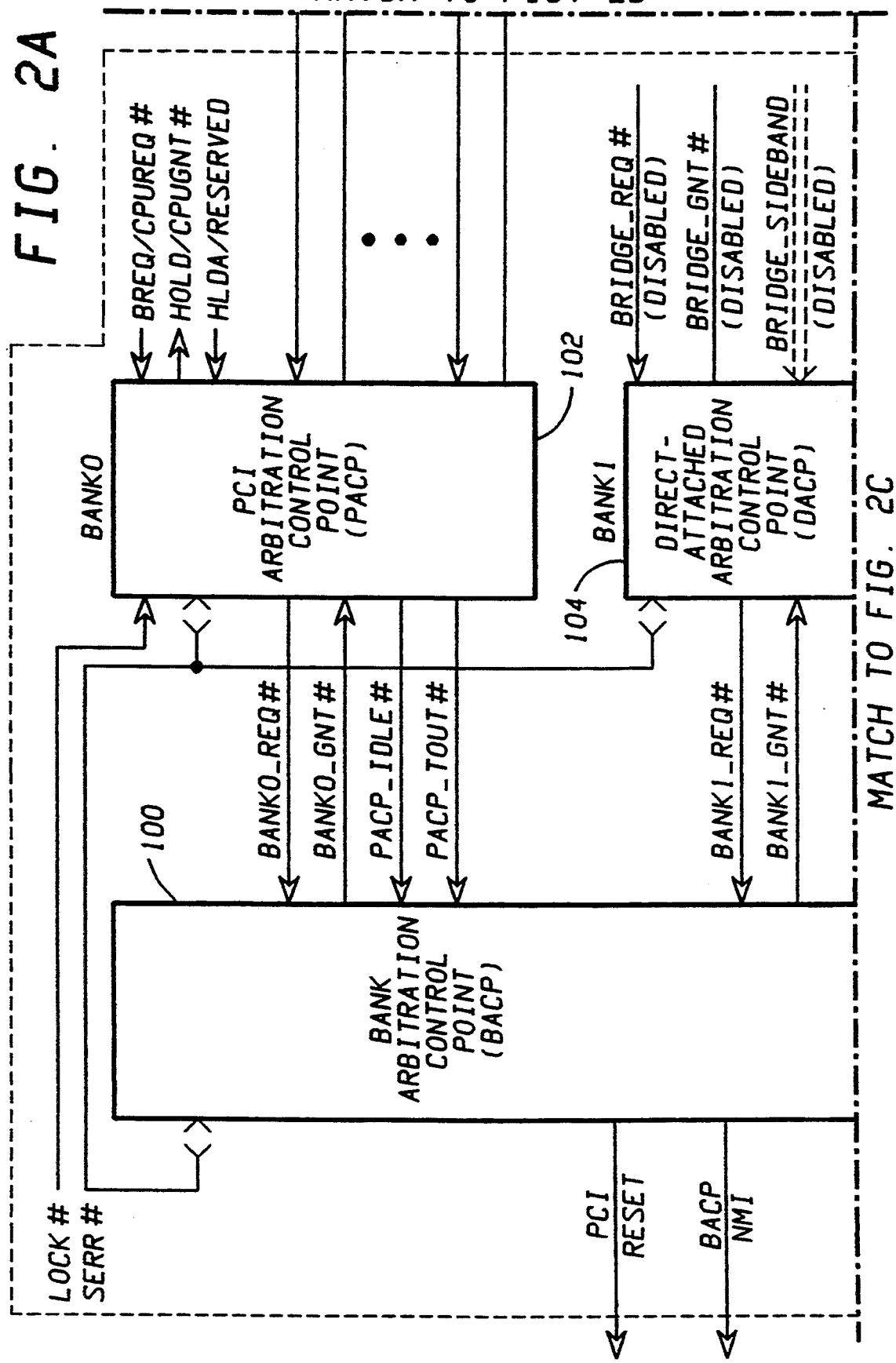

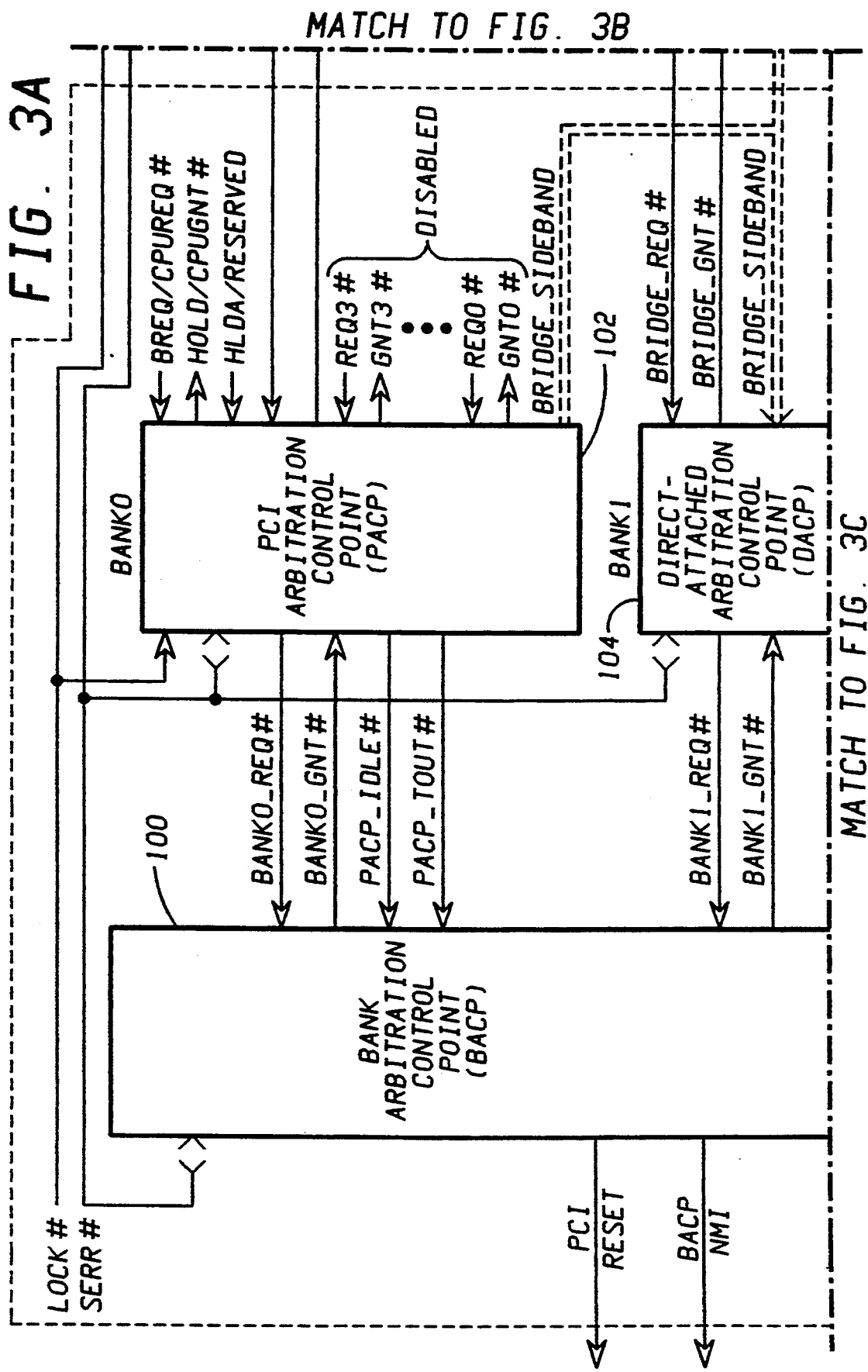

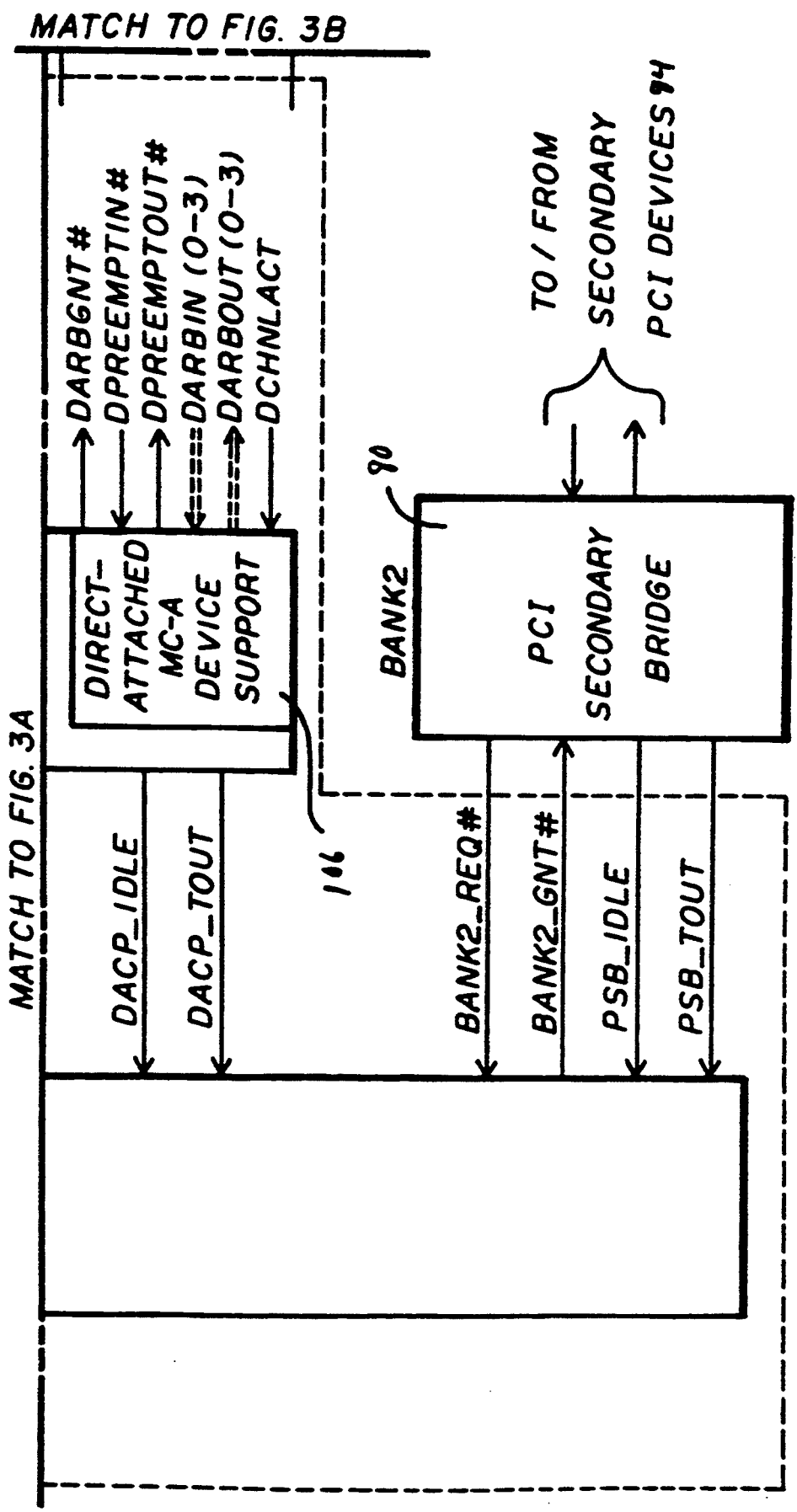

(I) = INPUT TO SACP 42
(O) = OUTPUT FROM SACP 42
(B) = BI-DIRECTIONAL I/O

| NO BRIDGE PRESENT | MC-A BRIDGE PRESENT ARB MODE | ISA BRIDGE PRESENT ARB MODE |
|---|---|---|
| REQ4#(I) | PACP2_REQ#(I) | PCI_REQ#(I) |
| GNT4#(O) | PACP2_GNT#(O) | PCI_GNT#(O) |
| REQ3#(I) | BRIDGE_REQ#(I) | BRIDGE_REQ#(I) |
| GNT3#(O) | BRIDGE_GNT#(O) | BRIDGE_GNT#(O) |
| REQ2#(I) | ARBID(3)(I) | RESERVED |
| GNT2#(O) | BR_PREEMPT#(B) | SH_REQUEST(I) |
| REQ1#(I) | ARBID(2)(I) | ISA_DACK2(O) |
| GNT1#(O) | RESERVED | RESERVED |
| REQ0#(I) | ARBID(1)(I) | ISA_DACK1(O) |
| GNT0#(O) | ARBID(0)(I) | ISA_DACK0(O) |

FIG. 4

| BRIDGE_REQ# | BRIDGE_GNT# | PACP2_REQ# | PACP2_GNT# | ARBIO FUNCTION |
|---|---|---|---|---|
| 1 | 1 | 1 | 1 | MC-A ARBID/ISA DACK |
| 0 | 1 | X | X | MC-A ARBID/ISA DACK |
| 0 | 0 | X | X | DMA SIDEBAND |
| 1 | 0 | X | X | DMA SIDEBAND |
| 1 | 1 | 0 | 1 | PACP2 ARBID |
| 1 | 1 | 1 | 0 | PACP2 ARBID |
| 1 | 1 | 0 | 0 | PACP2 ARBID |

FIG. 5

ARBITRATION LOGIC FOR MULTIPLE BUS COMPUTER SYSTEM

RELATED APPLICATIONS

The following United States patent applications are incorporated herein by reference as if they had been fully set out:

application Ser. No. 08/069,230 Filed May 28, 1993 Entitled "ERROR CAPTURE LOGIC FOR PERIPHERAL BUS IN MULTIPLE BUS COMPUTER SYSTEM" (Further identified as Attorney Docket BC9-93-025);

application Ser. No. 08/068,882 File May 28, 1993 Entitled "METHOD AND APPARATUS FOR PROVIDING BACK-TO-BACK DATA TRANSFERS IN AN INFORMATION HANDLING SYSTEM HAVING A MULTIPLEXED BUS" (Further identified as Attorney Docket BC9-93-026);

application Ser. No. 08/068,447 File May 28, 1993 Entitled "SYSTEM DIRECT MEMORY ACCESS (DMA) SUPPORT LOGIC FOR PCI BASED COMPUTER SYSTEM" (Further identified as Attorney Docket BC9-93-010);

application Ser. No. 08/070,134 File May 28, 1993 Entitled "METHOD AND APPARATUS FOR INITIALIZING MULTIPLE BUS NETWORKS IN AN INFORMATION HANDLING SYSTEM" (Further identified as Attorney Docket BC9-93-012);

application Ser. No. 08/069,234 File May 28, 1993 Entitled "METHOD AND APPARATUS FOR PROVIDING ACCURATE AND COMPLETE COMMUNICATION BETWEEN DIFFERENT BUS ARCHITECTURES IN AN INFORMATION HANDLING SYSTEM" (Further identified as Attorney Docket BC9-93-030); and application Ser. No. 08/068,877 File May 28, 1993 Entitled "BUS-TO-BUS BRIDGE FOR A MULTIPLE BUS INFORMATION HANDLING SYSTEM THAT OPTIMIZES DATA TRANSFERS BETWEEN A SYSTEM BUS AND A PERIPHERAL BUS" (Further identified as Attorney Docket BC9-93-031).

Background of the Invention

The present invention relates generally to arbitration mechanisms in computer systems, and more particularly to arbitration logic for computer systems comprising a plurality of buses interconnected by bus bridges.

Computer systems typically include more than one bus, each bus in the system having devices attached thereto which communicate locally with each other over the bus. System-wide communication over different buses is required, however, if a device attached to one bus needs to read or write information to or from a device on another bus. To permit system-wide communication between devices on different buses, bus-to-bus bridges (interfaces) are provided to match the communications protocol of one bus with that of another.

Known bus-to-bus bridges include those disclosed in the following issued patents and co-pending patent applications assigned to the IBM Corporation: application Ser. No. 07/815,992 entitled "BUS CONTROL LOGIC FOR COMPUTER SYSTEM HAVING DUAL BUS ARCHITECTURE"; U.S. Pat. No. 5,313,627 entitled "PARITY ERROR DETECTION AND RECOVERY"; application Ser. No. 07/816,204 entitled "CACHE SNOOPING AND DATA INVALIDATION TECHNIQUE"; U.S. Pat. No. 5,255,374 entitled "BUS INTERFACE LOGIC FOR COMPUTER SYSTEM HAVING DUAL BUS ARCHITECTURE"; application Ser. No. 07/816,691 entitled "BIDIRECTIONAL DATA STORAGE FACILITY FOR BUS INTERFACE UNIT"; application Ser. No. 07/816,693 entitled "BUS INTERFACE FOR CONTROLLING SPEED OF BUS OPERATION"; U.S. Pat. No. 5,265,211 entitled "ARBITRATION CONTROL LOGIC FOR COMPUTER SYSTEM HAVING DUAL BUS ARCHITECTURE"; and application Ser. No. 07/816,698 entitled "METHOD AND APPARATUS FOR DETERMINING ADDRESS LOCATION AT BUS TO BUS INTERFACE", all filed on Jan. 2, 1992. These applications describe mechanisms which permit system-wide communication of devices attached to different buses in the system.

Each bus-to-bus bridge in a multiple-bus computer system is used to connect two buses in the system. Various types of buses are available to construct a given computer system. Standard I/O buses include, for example, ISA or MICRO CHANNEL® ("MC-A") buses, are often used to connect existing peripheral I/O devices to a system built around a more centralized, high performance bus.

One such high performance bus which is becoming widely accepted is the PCI (Peripheral Component Interconnect) bus, which is capable of performing significant data transfer in a relatively short period of time. The PCI bus permits up to 120 megabytes of usable data per second throughput, 132 megabytes/second peak at 33 MHz with a 32-bit data path. The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate the peripheral devices and the bus.

The primary PCI bus operates on a synchronous clock signal of 33 MHz, and the strings of data transmitted over the PCI bus are 32 bits long. A 32-bit data string on the PCI bus is called a double word (DWORD), which is divided into 4 bytes each comprised of 8 bits of data. The address and data information carried by the PCI bus are multiplexed over the same 32-bit bus. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide", revision 0.6 published Nov. 1, 1992, and "Peripheral Component Interconnect (PCI) Add-in Board/Connector Addendum", (Draft) published Nov. 6, 1992; all by the PCI Special Interest Group, the contents of which references are incorporated herein by reference as if they were fully set forth.

Interfacing the PCI bus to standard I/O buses in a computer system is problematic, however, if the communications protocols between the PCI bus and the standard I/O bus are different. For example, system wide arbitration between I/O devices attached to the standard I/O bus and PCI devices attached to the PCI bus is not possible unless communications protocols over the two buses are matched. Currently, mismatched protocols between the PCI bus operations and those supported by standard I/O bus prevents such system-wide arbitration.

Thus, it is an object of the present invention to provide a system-wide arbitration mechanism which may be used in a computer system which includes a high performance bus (such as a PCI bus) and also which has the ability to electively add an expansion bridge for supporting a standard I/O bus. It is a further object of the invention to permit such an arbitration mechanism to operate within the system whether or not the system includes the expansion bridge.

SUMMARY OF THE INVENTION

The present invention provides arbitration logic for a multiple bus computer environment. The logic is adapted to perform system-wide arbitration whether or not an expansion bridge (such as in ISA bridge or a MICRO CHANNEL® ("MC-A") bridge) is used in the multi-bus environment. In either case, the logic is implemented in a system arbitration control point (SACP) which comprises a bank arbitration control point (BACP), and a pair of bank arbiters (a PCI arbitration control point (PACP) and a direct-attached arbitration control point (DACP)). The BACP arbitrates between requests presented by the PACP and the DACP for control of the primary PCI bus.

In embodiments of the invention wherein no expansion bridge is present in the system, the PACP manages primary PCI bus access requests presented by a CPU and primary PCI devices attached to the PCI bus. The PCI devices present their requests for and receive grants to access the PCI bus over request/grant input/output lines to the PACP. The request/grant lines are direct connections between the primary PCI devices and the PACP. The DACP handles primary PCI bus requests presented by an integrated I/O controller directly attached to the DACP and arbitrating on behalf of the peripheral I/O devices which it controls.

In a second embodiment of the invention which includes an expansion bridge in the system, there is no direct connection between the primary PCI devices and the PACP. Instead, a secondary arbitration control point PACP2, located physically within the standard bus bridge, receives the primary PCI device bus access requests. PACP2 arbitrates between the attached primary PCI devices and presents a single bus access request to the primary PACP on a single request line. The PACP then arbitrates between the CPU and the highest priority PCI device selected by the PACP2, and presents a bus request to the BACP on behalf of the highest priority device.

A central arbitration control point (CACP), physically located on the expansion bridge, manages the arbitration of the I/O devices attached to the standard bus supported by the expansion bridge. The CACP selects the highest priority I/O device and presents a single request on behalf of this device to the DACP. The DACP arbitrates between peripheral I/O devices controlled by the integrated I/O controller and the selected standard bus I/O device, and presents a single bus request to the BACP on behalf of the highest priority device. The BACP then arbitrates between the requests presented by the PACP and the DACP for control of the primary PCI bus.

Because no direct connections exist between the primary PCI devices and the PACP in this second embodiment, the pins which were previously used as PCI request grant signals can now be used for communication between the primary PACP and the secondary PACP2. These pin connections are redefined as sideband signals, which are used to support distributed arbitration between the primary PACP and DACP, and the secondary PACP2 and CACP located on the expansion bus. The sideband lines directly connect between the expansion bridge and the SACP, and include information which identifies (i) the standard I/O device supported by the expansion bridge which is presenting a PCI bus access request via the CACP and (ii) the primary PCI device which is presenting a PCI bus access request via the PACP2. By providing this identification information, the PACP and the DACP may more fairly arbitrate between, respectively, (i) the primary PCI devices and the CPU and (ii) the I/O devices supported by the expansion bridge and the directattached peripheral I/O devices.

BRIEF DESCRIPTION OF THE DRAWINGS

FIGS. 1A through 1C, taken together, is a block diagram of an information handling system constructed according to the principles of the present invention;

FIGS. 2A through 2C, taken together, is a block diagram of one embodiment of the system arbitration control point shown in the system of FIG. 1;

FIGS. 3A through 3D, taken together, is a block diagram of another embodiment of the system arbitration control point shown in the system of FIG. 1;

FIG. 4 is a table showing alternate definitions of input/output pin connections into and out of the system arbitration control point which correspond to the embodiments shown in FIGS. 2 and 3; and FIG. 5 is a table showing multiplexed arbitration sideband signals.

DETAILED DESCRIPTION OF THE PREFERRED EMBODIMENT

Figure 1A:
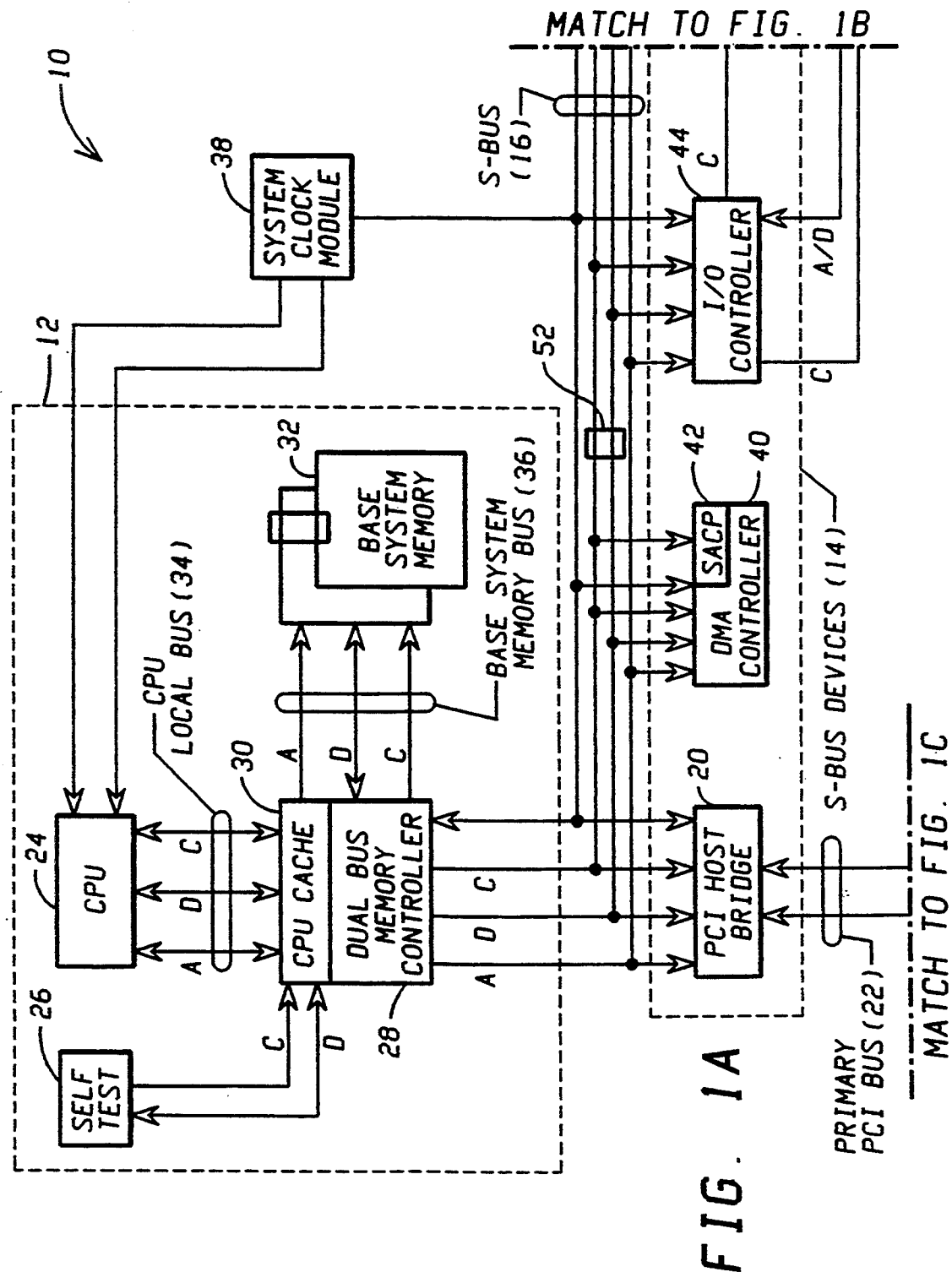
Figure 1B:
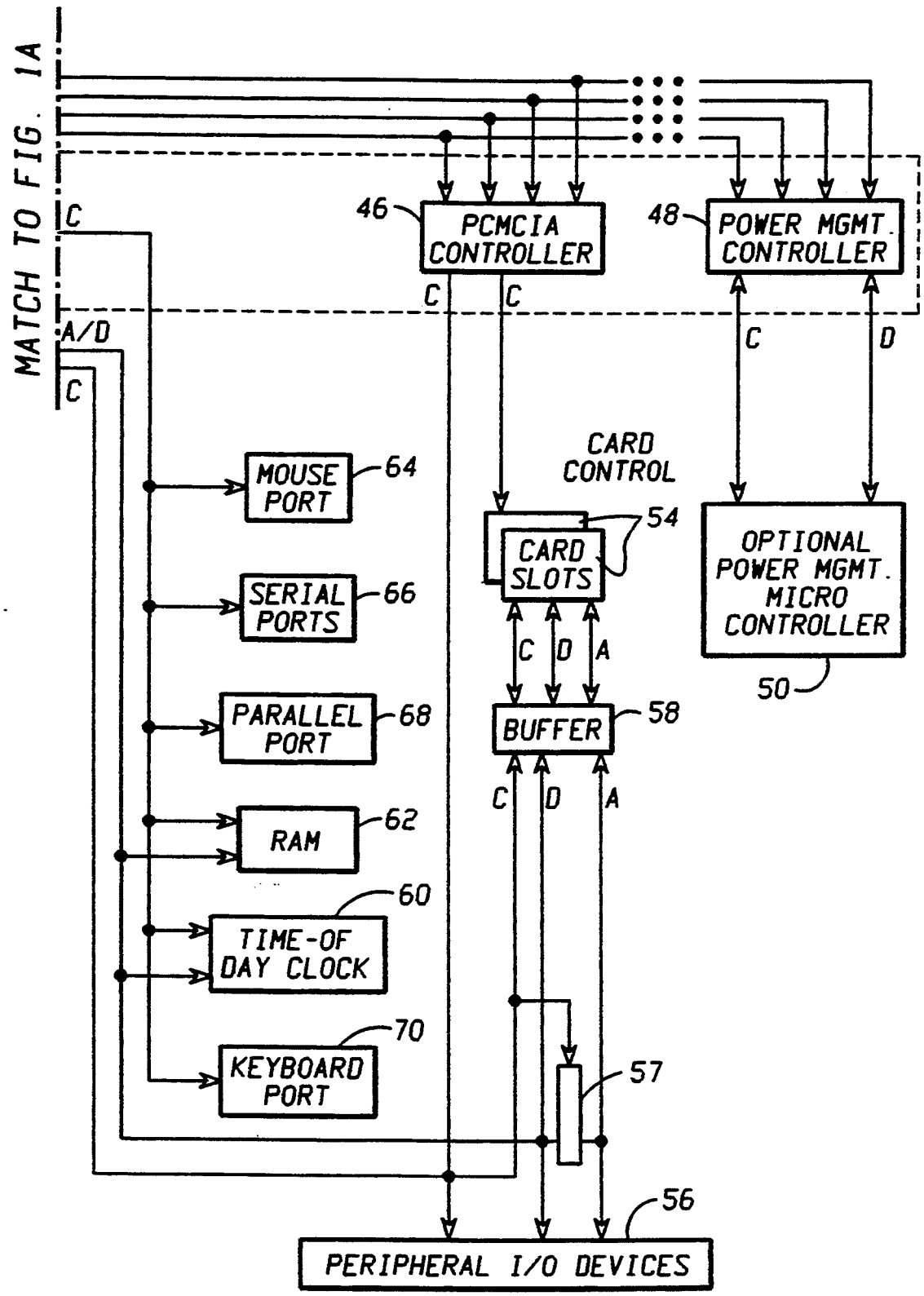

Referring now to FIG. 1, a multi-bus information handling system 10 is shown generally at 10, comprising, (i) a processor, cache and memory complex 12 connected to S-bus (system bus) devices 14 via an S-bus 16 and (ii) primary PCI devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIG. 1 will be provided hereinafter.

The processor, cache and memory complex 12 comprises a central processing unit (CPU) 24, a self-test circuit 26, a dual bus memory controller 28, a CPU cache 30, and base system memory 32. The CPU 24 in the preferred embodiment is a 32-bit microprocessor available from Intel, Inc. under the trade designation i486 TM, although it is contemplated that the system 10 may be implemented using other types of CPUs, especially other x86-type microprocessors. The self-test circuit 26 provides a built-in-self-test (BIST) feature for the CPU 24 upon power-up. The self-test circuit also controls any self-test features which may be incorporated within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by an S-bus device 14 over the S-bus 16. Because the memory controller has the capability to manage operations on two buses, operations over the base system memory bus 36 and the CPU local bus 34 may be managed simultaneously. The CPU local bus 34, the base system memory bus 36, and the S-bus are 32-bit buses, each of which buses comprises data, address and control information paths ("D", "A", and "C" in FIG. 1) as is typical of such buses.

Base system memory 32 provides system-wide storage capability and may comprise either non-interleaved or interleaved memory cards. The CPU cache 30 permits short term storage of information contained within either base system memory 32 or expansion memory 35 located elsewhere within the system 10. Such expansion memory could, for example, be located on the peripherally attached I/O devices within the system. The CPU cache 30 incorporates random access memory (RAM, not shown) which is used to temporarily stores address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a CPU or local bus-initiated memory cycle, the memory controller does not pass information onto the S-bus. However, if the memory controller determines that the CPU (local bus) operation it is managing is an I/O cycle, the memory controller propagates the information onto the S-bus 16 for access thereto by an S-bus device 14. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S-bus devices 14, and a pair of clock signals for the CPU 24. In the preferred embodiment, the clock signal provided to the S-bus operates at 33 MHz. The two signals provided to the CPU 24 operate at 33 MHz and 66 MHz, respectively. The CPU 24 requires two clock signals because it operates internally at 66 MHz, but communicates over the CPU local bus 34 at 33 MHz.

Communications between the processor, cache and memory complex 12 and the S-bus devices are managed by the memory controller 28 over the 32-bit S-bus 16. Also attached to the S-bus, as shown in the preferred embodiment of FIG. 1, are a direct memory access (DMA) controller 40, a system arbitration control point (SACP) 42, an input/output (I/O) controller 44, a PCMCIA controller 46, and a power management controller 48. An optional power management micro-controller 50 may be attached to the power management controller 48 in case more sophisticated power management control is desired. A buffer 52 is provided on the S-bus 16 intermediate the DMA controller 40 and the I/O controller 44. As shown in FIG. 1, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. An address latch 57 is provided intermediate the buffer 58 and the peripheral I/O devices 56. The peripheral I/O devices 56 are controlled by the I/O controller 44. Attached to the I/O controller are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second high speed, high bandwidth bus, which in the preferred embodiment is the primary PCI bus 22. Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is itself an S-bus device residing on the S-bus. The PCI host bridge 20, then, serves as an interface between the S-bus 16 and the primary PCI bus 22 and provides an effective means of communication between these two buses, and any peripheral devices which may be attached to these buses.

The PCI host bridge 20 provides a low latency interconnect mechanism through which the CPU 24 or other S-bus device 14 may directly access the primary PCI devices 18 or devices attached thereto. The bridge 20 also provides a high performance path which allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses.

The primary PCI bus 22 is capable of supporting a variety of devices which are PCI compatible. As shown in FIG. 1, these devices may include a graphics controller 72, a serial SCSI (small computer systems interface) controller 74, a future PCMCIA controller 76, a standard I/O bus (e.g., ISA or MICRO CHANNEL®) ("MC-A")) bridge 78 (also referred to herein as an expansion bridge), and a PCI secondary bridge 80. The devices shown in FIG. 1 attached to the primary PCI buss however, are only one example of a system implementing a PCI bus architecture and thus the disclosed exemplary configuration and is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., MC-A or ISA) bus 92 and the primary PCI bus 22. Secondary PCI devices 94 are connected to PCI secondary bridge 80 via secondary PCI bus 96. Any number of unidentified secondary PCI devices 94 may then be connected to the secondary PCI bus 96. The PCI secondary bridge 80 serves as an interface between the secondary PCI devices 94 attached to the secondary PCI bus 96, and the primary PCI bus 22.

The DMA controller 40, the PCI host bridge 20, and the I/O controller 44 control the exchange of information between base system memory 32 and expansion memory on the peripheral I/O devices 56 or on the standard I/O devices 90. The DMA controller 40 also provides three functions on behalf of the CPU, cache and memory complex 12. First, the DMA controller 48 utilizes a small computer subsystem control block (SCB) architecture to configure DMA channels, thus avoiding the necessity of using programmed I/O to configure the DMA channels. Second, the DMA controller provides a buffering function to optimize transfers between slow I/O expansion devices and the typically faster base system memory 32. Third, the DMA controller provides an eight channel, 32-bit, direct base system memory access function. When providing the direct base system memory access function, the DMA controller 40 may function in either of two modes. In a first mode of operation, the DMA controller functions in a programmed I/O mode in which the DMA controller is functionally a slave to the CPU 24. In a second mode of operation, the DMA controller itself functions a master on the S-bus.

The DMA controller 40 always functions as a third party bus master. It is never a source or destination of data, but it does provide a means for transferring data between a source entity and a destination entity. Although shown residing on the S-bus in FIG. 1, the DMA controller need not reside on the S-bus. The DMA controller typically manages data transactions from memory to an I/O device, from an I/O device to memory, from memory to memory. The memory may be either base system memory 32 or peripheral memory on the peripheral I/O devices 56 or on the standard I/O devices 90.

The standard I/O devices 90 residing on the standard (e.g., ISA or MC-A) bus 92 may be 8-bit type devices, 16-bit type devices, or 32-bit type devices. The design of the PCI host bridge 20 and the system arbitration control point (SACP) 42 according to the present invention permits simultaneous arbitration on a system-wide basis of (i) the CPU 24, (ii) primary PCI devices 18 residing on the primary PCI bus 22, (iii) standard I/O devices 90 residing on the standard I/O bus 92, and (iv) peripheral I/O devices 56 controlled by the I/O controller 44. The SACP 42 functions as the primary arbiter for the standard I/O devices 90, the CPU 24, the primary PCI devices 18, and the peripheral I/O devices 56.

Figure 2B:
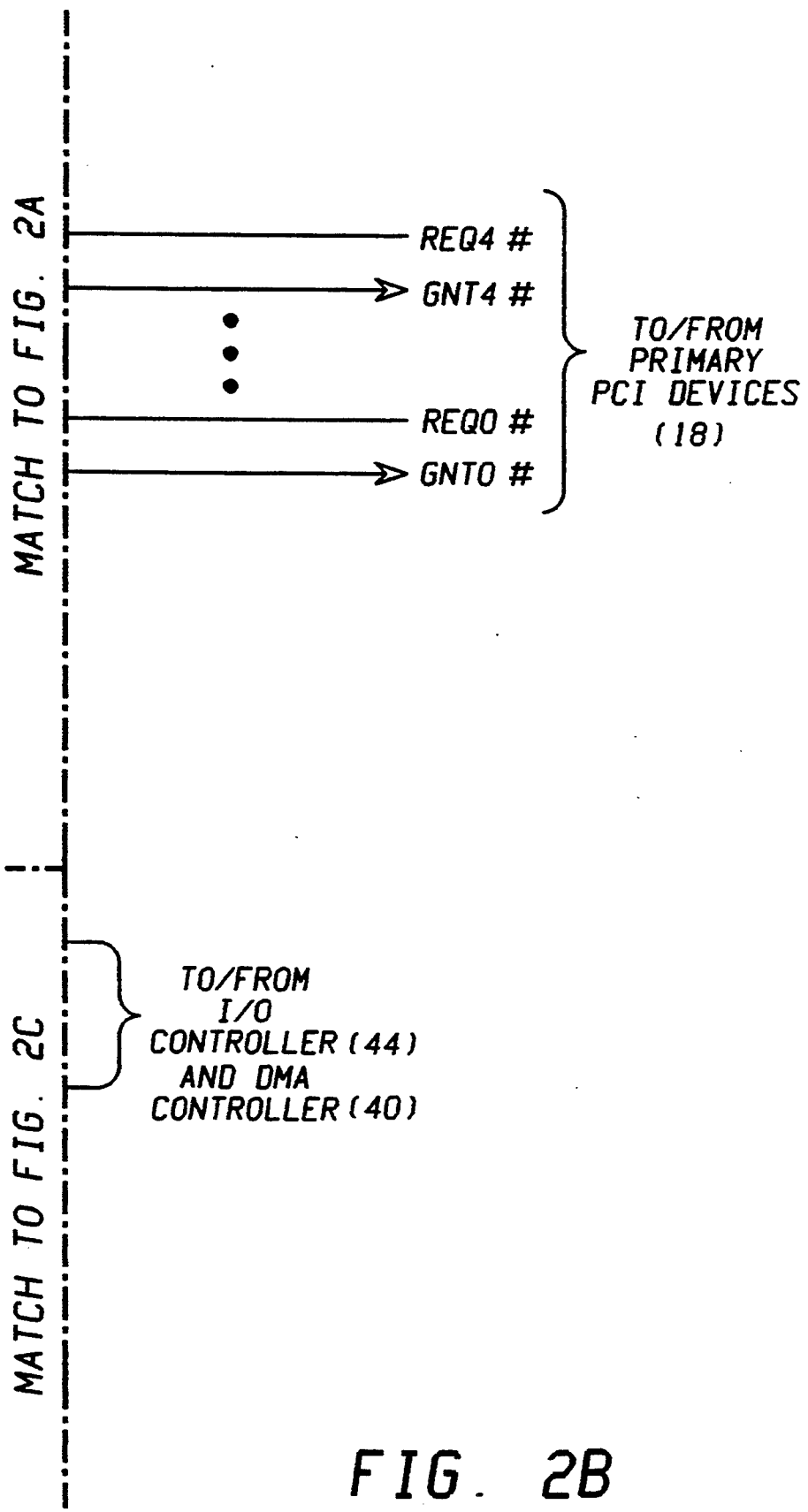
Figure 2C:
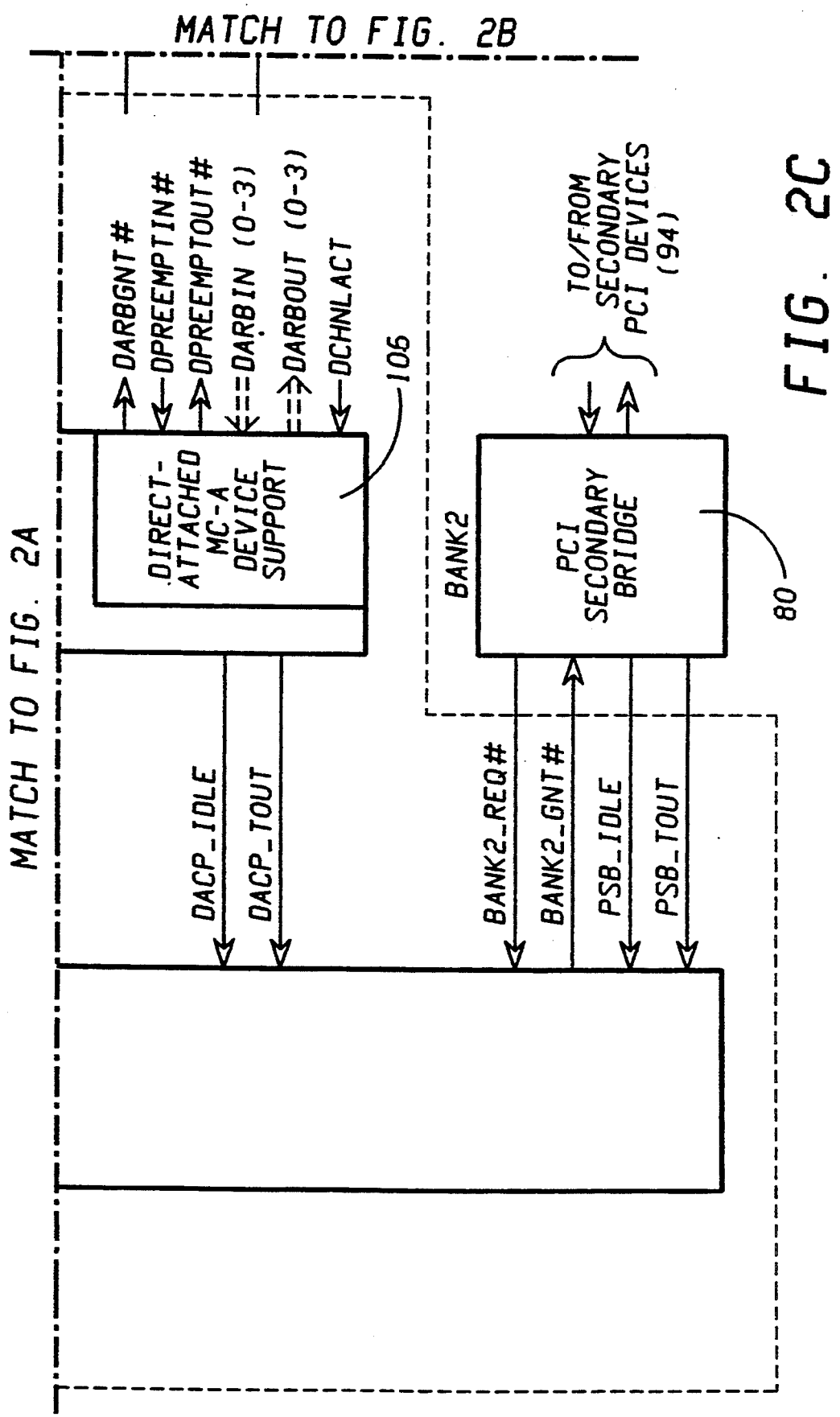
Figure 3B:
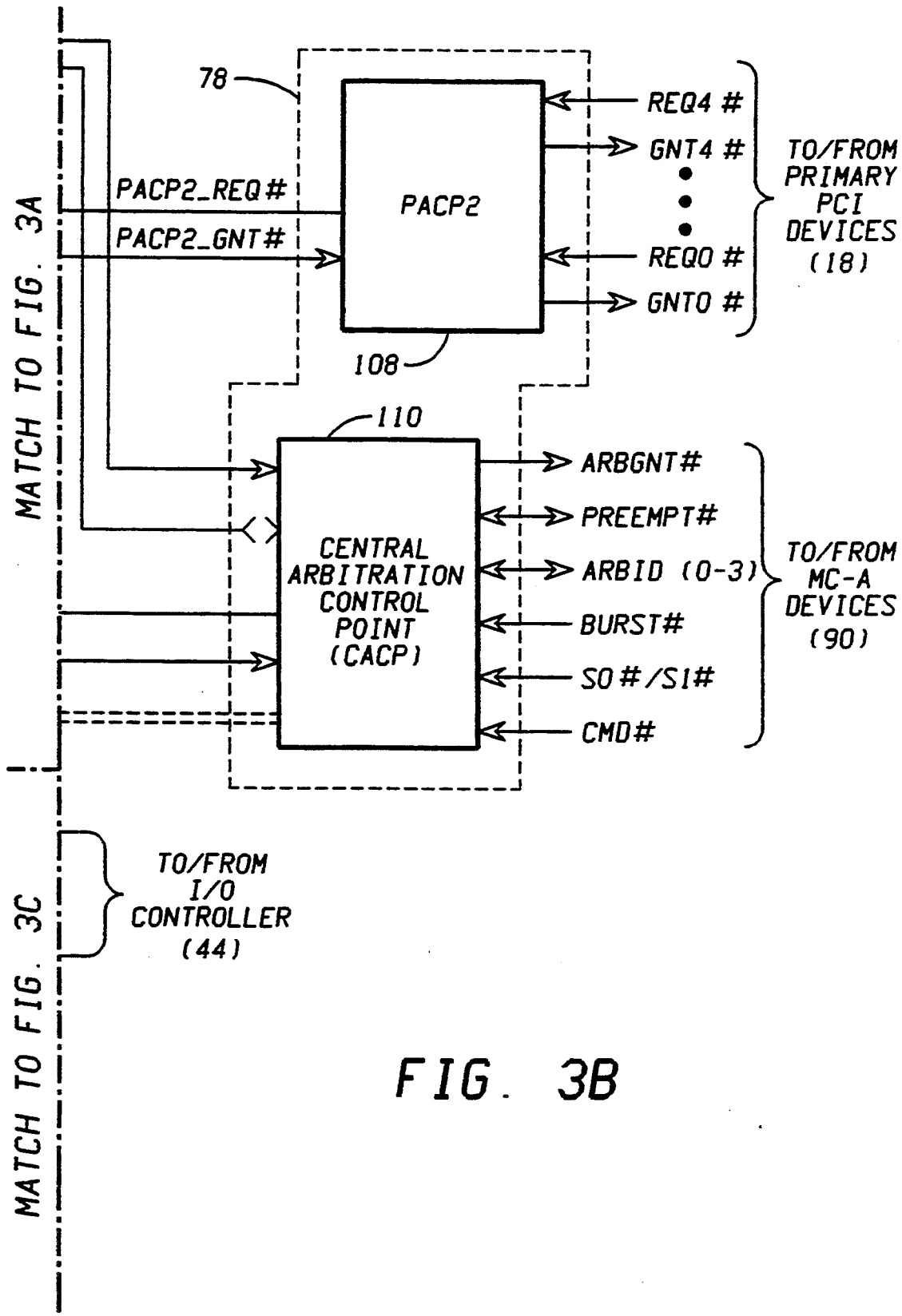
Figure 3C:
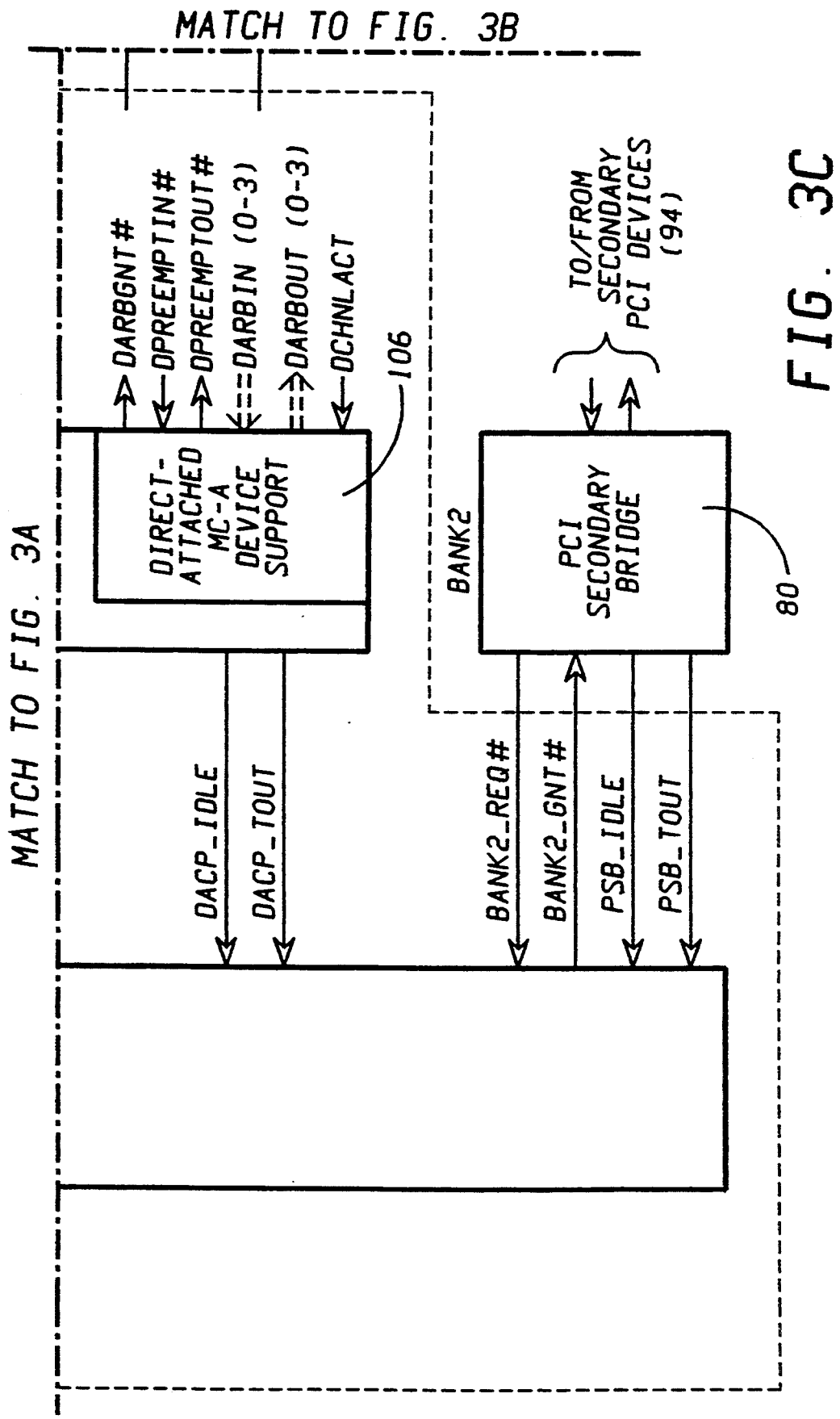

Block diagrams of implementations of the SACP 42 are shown in FIGS. 2 and 3. FIG. 2 is a block diagram of an embodiment of the system arbitration control point used when the system shown in FIG. 1 does not include a standard bus bridge 78 attached to the primary PCI bus 22. FIG. 3 is a block diagram of a second embodiment of the system arbitration control point used when the system shown in FIG. 1 includes a standard bus bridge 78 attached to the primary PCI bus 22.

Referring first to FIG. 2, the SACP 42 implementation used when no standard bus bridge 78 is present comprises a bank arbitration control point (BACP) 100, a PCI arbitration control point (PACP) 102, and a direct-attached arbitration control point (DACP) 104. The BACP 100 arbitrates between requests by the PACP 102 and the DACP 104 for control of the primary PCI bus 22. The PACP 102 manages primary PCI bus access requests presented to it by the CPU 24 and the primary PCI devices 18 (collectively "BANK0 requests"). The DACP 104 handles primary PCI bus requests presented to it by the I/O controller 44 on behalf of the peripheral I/O devices 56 which it controls. As will be explained later with reference to FIG. 3, the DACP 104 also manages primary PCI bus access requests presented by the standard bus bridge 78 on behalf of standard I/O devices 90 attached thereto, in systems including a standard bus bridge 78 attached to the primary PCI bus 22.

The primary PCI bus requests presented by the standard bus bridge 78 and the I/O controller 44 and the DMA controller 40 are collectively referred to herein as "BANK1 requests". The BACP 100, in addition to managing primary PCI bus access requests presented by the PACP 102 and the DACP 104, is adapted to handle primary PCI bus requests by the PCI secondary bridge 80 on behalf of secondary PCI devices attached thereto (collectively "BANK2 requests"). Further expansion to include bank arbiters other than those shown in FIGS. 2 and 3 (the PACP 102, the DACP 104 and the PCI secondary bridge 80) is contemplated by the present invention. If other secondary PCI bridges are included in the system in a multi-tier structure attached to the PCI bus 22, these other secondary PCI bridges will themselves perform arbitration among attached devices and present a "BANKN" request to the BACP 100.

The hierarchical architecture described above provides an arbitration scheme for the system 10 wherein (i) arbitration between the CPU and primary PCI devices is managed independently of (ii) arbitration between peripheral I/O devices controlled by the I/O controller and standard I/O devices attached to the standard bus bridge 78 (when present). The PACP 102 receives requests for access to the PCI bus 22 directly from up to five PCI devices 18 and the CPU 24 via five pins on the PACP 102. The five PCI devices present their requests using five request/grant pairs on the PACP; REQ0# through REQ4# (as used herein, the symbol "#" is used to denote negative active signals). The PCI devices are granted access to the primary PCI bus 22 via grant lines GNT0# through GNT4#. The request lines and grant lines are direct connections between the primary PCI devices 18 and the PACP 102.

Although the CPU 24 accesses base system memory via the memory controller 28, if the CPU requires access to the primary PCI bus 22, it must compete with like requests made by the primary PCI devices 18. Once the CPU 24 gains control of the S-bus 16, the primary host bridge will provide a bus master interface between the primary PCI bus and the S-bus, and will present the CPU 24 as a PCI master. Although the PCI host bridge performs no arbitration, it does perform protocol conversion, buffering, and speed matching between the S-bus and the PCI bus.

In the embodiment of the present invention shown in FIG. 1, the dual bus memory controller 28 connects directly to the PACP 102 on behalf of the CPU 24. The primary PCI bus access request for the CPU 24 is presented to the PACP 102 on the request line BREQ which is used as a preempt signal (typical of i486-type processors) to the PACP. The dual bus memory controller 28 uses a hold/hold acknowledge protocol via dedicated lines HOLD and HLDA between the dual bus memory controller 28 and the PACP 102. In embodiments of the system wherein the CPU is not of the i486 architecture, the PACP-CPU interface is unknown and thus the PACP must also support a PCI request/grant handshake (CPUREQ# and CPUGNT#) in addition to the i486 BREQ/HOLD/HLDA. Accordingly, both the dual bus memory controller 28 on behalf of the CPU 24 and the PCI devices each have direct connections for arbitration request and grant signals to and from the PACP 102.

The pending requests between the primary PCI devices 18 and the dual bus memory controller 28 may be handled by the PACP 102 in two different manners. The PACP 102 can handle a plurality of arbitration algorithms. This is accomplished by providing a programmable ARBID and fairness bit per PACP REQ/GNT. By a round robin procedure, the PACP services the pending requests in sequential order. A second approach is to manage the requests in a fixed priority. This second approach is possible if an arbitration priority is assigned to each of the primary PCI devices 18 and the CPU 24. Specifically, the CPU request line BREQ/CPUREQ# and the primary PCI device request lines REQ0#-REQ4# have programmable priority levels. The priority levels may be determined based on the bandwidths of the PCI devices involved. For example, a PCI device possessing a high bandwidth and low buffering capability should be assigned a higher arbitration priority than devices having smaller bandwidths and/or higher buffering capability.

Regardless of the approach taken, the PACP 102 arbitrates among the PCI devices and the CPU requests, determines which of the PCI devices or the CPU has priority, and presents a single device request to the BACP on BANK0_REQ# line, along with the requests presented by the other bank arbiters (BANK1_REQ#, BANK2_REQ#, etc.). Access to the primary PCI bus 22 is granted to the selected device via grant lines output by the BACP (BANK0_GNT#, BANK1_GNT#, BANK2_GNT#, etc.), The operation of the first bank arbiter, PACP 102 (BANK0), has been described above. A description of the operation of the second bank arbiter, DACP 104 (BANK1), follows.

The DACP 104 is responsible for arbitrating between peripheral I/O devices 56 controlled by the I/O controller 44 (in embodiments of the system wherein no standard bus bridge 78 is used) or between peripheral I/O devices 56 and standard I/O devices 90 attached to the standard bus bridge 78 when one is included in the system. The peripheral I/O devices 56 and the peripheral I/O devices 90 may be compatible with either MICROCHANNEL® (MC-A) or ISA architecture. As shown in FIGS. 2 and 3, the control signals to which the DACP 104 responds correspond to MC-A architecture. Although the DACP may be implemented to respond to ISA-type control signals, MC-A arbitration provides a more powerful and flexible means of arbitration.

With continued reference to FIG. 2 (no standard bus bridge 78 present), the DACP 104 receives primary PCI bus access requests from the I/O controller 44 on behalf of the peripheral I/O devices 56 at a portion of the DACP designated direct-attached MC-A device support 106. These requests are made over the DPREEMPTIN# line. The direct-attached MC-A device support portion 106 of the DACP 104 alternates between arbitration and grant cycles in performing arbitration between peripheral I/O devices 56 competing for access to the primary PCI bus 22. The status of the DARBGNT# line indicates whether the direct-attached MC-A device support portion 106 is in an arbitration or a grant cycle. Bus access requests are managed over the DPREEMPTOUT# line. The DPREEMPTOUT# output and DPREEMPTIN# input conform to MC-A protocol. However, unlike MC-A protocol, which requires a minimum of 200 nanoseconds, the DACP utilizes a fast serial arbiter which allows direct attached device arbitration cycles to be completed in just 2 clock cycles. The other signal lines in and out of the direct-attached MC-A device support portion 106 will be described in the context of FIG. 3. The BRIDGE_REQ#, BRIDGE_GNT#, and BRIDGE_SIDEBAND signal lines to and from the DACP 104 in FIG. 2 are disabled because no standard bus bridge 78 is present.

In FIG. 3, however, the system 10 includes a standard bus (expansion) bridge 78 connected to the primary PCI bus 22. In this embodiment, the DACP 104 arbitrates between peripheral I/O devices 56 controlled by the I/O controller 44 and standard I/O devices 90 attached to the standard I/O bus 92 supported by the standard bus bridge 78, each of which devices compete for access to the primary PCI bus 22. As explained above, the peripheral I/O devices 56 and the standard I/O devices 90 are either MC-A or ISA-compatible.

Five request/grant pairs REQ0#/GNT0# through REQ4#/GNT4# are still used by primary PCI devices 18 to request and be granted access to the PCI bus 22. However, these request/grant lines are directed into a secondary PCI arbitration control point, PACP2 108, and not the PACP 102. The PACP2 108 is located physically within the standard bus bridge 78, and is cascaded into the PACP 102. PACP2 108 arbitrates between the attached primary PCI devices 18 and presents a single bus access request PACP2_REQ# with a corresponding ARBID to the primary PACP 102. Arbitration priorities are handled in a similar manner to that in which they are managed in the PACP 102. The PACP then arbitrates between the CPU 24 (the bus access request of which is presented on the BREQ/CPUREQ# line) and the highest priority PCI device (the bus access request of which is presented on the PACP2_REQ# line). The primary PCI devices have their request for PCI bus access granted over the PACP2_GNT# line.

Because arbitration among PCI devices is handled outside the SACP 42 in the embodiment of FIG. 3, the functions of the request/grant lines in and out of the SACP are redefined for the system of FIG. 3. FIG. 4 is a table showing alternate definitions of pin connections into the SACP 42 corresponding to the embodiments shown in FIGS. 2 and 3. The five pairs of request/grant lines REQ0# and GNT0# through REQ4# and GNT4#, which are used by the primary PCI devices to request and be granted access to the PCI bus 22 in the system not having a standard bus bridge 78 attached to the primary PCI bus (FIG. 2), are redefined when the system does include a standard bus bridge 78 (FIG. 3). Because PACP2 108 handles the primary PCI device bus access requests outside the SACP 42 and presents a single request to the PACP 102, REQ4# is redefined as the single request PACP2_REQ#. Similarly, GNT4# is redefined as a single grant line as PACP2 GNT#. REQ0#/GNT0# through REQ3#/GNT3# lines into and out of the PACP 102 are disabled.

With eight input/output lines (REQ0#/GNT0# through REQ3#/GNT3#) disabled in the system of FIG. 3, eight new pin connections are available as inputs to the SACP 42, having been freed up by the addition of PACP2. These input/output lines are required for the system of FIG. 3 to permit distributed arbitration of standard I/O devices 90 concurrently with peripheral I/O devices 56, as well as the CPU concurrently with the PCI devices.

As shown in FIG. 3, a central arbitration control point CACP 110, physically located on the MC-A bridge 78, manages the arbitration of MC-A devices 90. A MC-A device requests arbitration by activating the PREEMPT# signal into the CACP 110. The CACP alternates between arbitration and grant cycles which are indicated by the state of the ARBGNT# line. When the PREEMPT# signal is activated, the CACP enters the arbitration state during which the MC-A devices drive their arbitration identification outputs (ARBID(0-3)). After 300 nanoseconds, the arbitration identification of the highest priority MC-A device remains on the ARBID(0-3) lines. This single request is presented on the BRIDGE_REQ# signal line to the DACP 104. The DACP, by using the ARBID sideband signals, if having determined that the request presented by the CACP has priority over a request presented by the I/O controller 44 on behalf of the peripheral I/O devices 56, will activate the BRIDGE_GNT# signal line. (As shown in FIG. 4, the REQ3#/GNT3# lines are redefined as the BRIDGE_REQ# and BRIDGE_GNT# signal lines, disabled in the system corresponding to FIG. 2, into and out of the DACP 104). The ARBGNT# line enters the grant state and the highest priority MC-A device determines that it has been selected and that its bus access request has been granted. Operation of the CACP 110 is explained more fully in co-pending applications Ser. No. 07/777,777 (U.S. Pat. No. 5,301, 282) filed Oct. 15, 1991 and entitled "Controlling Bus Allocation Using Arbitration Hold" and Ser. No. 07/816,116 (U.S. Pat. No. 5,265,211) filed Jan. 2, 1992 for "Arbitration Control Logic for Computer System having Dual Bus Architecture" the texts of which are incorporated herein by reference.

The six remaining inputs into the SACP 42, REQ0#/GNT0# through REQ2#/GNT2#, are redefined as the six BRIDGE_SIDEBAND signals (disabled in the system corresponding to FIG. 2). BRIDGE_SIDEBAND signals are not defined in the PCI architectural specification but are required to support arbitration as well as DMA peripherals on the PCI bus, such as the standard I/O devices 90 attached to the standard bus bridge 78, to provide an effective PCI-ISA or PCI-MC-A interface. The BRIDGE_SIDEBAND lines directly connect the standard bus bridge 78 with the SACP 42. With reference to FIG. 4, these BRIDGE_SIDEBAND signals have different definitions, depending on whether the standard bus bridge 78 is MC-A or ISA-compatible. When the bridge is not granted, the six sidebands include the identification information (ARBID(0) through ARBID(3)) in MC-A, which identifies the MC-A I/O device presenting the PCI bus access request, or ISA_DACK(0) through ISA_DACK(2) in ISA, which identifies which ISA device is to be granted the bus.

With reference to the MC-A implementation of the present invention, using the ARBID(0) through ARBID(3), the BRIDGE_SIDEBAND signal lines are used to convey identification information to the SACP 42 relating to the primary PCI devices 18 and the MC-A devices 90 requesting access to the PCI bus 22. The status of these four lines indicates to the PACP 102 which primary PCI device 18 won the initial arbitration process managed by the PACP2 108, and further indicates to the DACP 104 which MC-A device 90 won the initial arbitration process managed by the CACP 110. By providing information identifying the primary PCI devices presenting bus access requests to the PACP2 and identifying the MC-A devices presenting bus access requests to the to the CACP 110, the PACP and the DACP may more fairly arbitrate between, respectively, (i) the primary PCI devices and the CPU and (ii) the I/O devices supported by the expansion bridge and the direct-attached peripheral I/O devices.

In the case of ISA devices, arbitration of such devices would be handled by an ISA-compatible arbitration device (IACP), via DREQ# and DACK# lines, because the ISA protocol supports direct requests and acknowledges to and from the devices attached to the ISA-compatible arbitration device. The ISA IACP activates the bridge request signal whenever one of the individual DREQ# lines is activated. In addition, the ISA IACP conveys the state of the DREQ# inputs to the DACP using the serial DREQ# sideband signal. The DACP translates the ISA DREQ# signals into individual ARBIDs which are then used to arbitrate with the ARBIDs presented by the peripheral I/O devices 56. If the ISA DREQ# signal has priority, the IACP will be granted the bus. The DACP indicates that the IACP has been granted the bus by activating the BRIDGE_GNT# signal and driving the ISA DACK(0-2) signals with an encoded ID which represents which DACK# should be activated.

Identification information relating to the peripheral I/O devices 56 presenting PCI bus access requests via the I/O controller 44 is carried by the DARBIN(0-3) inputs to and DARBOUT(0-3) outputs from the direct-attached MC-A device support portion 106. Separate DARBIN and DARBOUT lines are required because, unlike the CACP 110, the direct-attached MC-A device support portion 106 is not provided with open collector bidirectional arbitration identification lines. Otherwise, arbitration performed by the direct-attached MC-A device support portion 106 is managed as it is in the CACP 110. In this manner, the DACP 104 determines if the request presented by the CACP 110 has priority over the request presented by the I/O controller 44, and presents a BANK1_REQ# to the BACP.

All of the peripheral I/O devices 56 and the standard I/O devices 90 are assigned an arbitration priority. The DACP 104 is provided with a comparator which compares these arbitration priorities in determining which device should be granted access to the PCI bus 22. Similarly, all the PCI devices are assigned an arbitration ID which the PACP 102 uses to determine if the request presented by the PACP2 108 has priority over a CPU 24 request, and presents a BANK0_REQ# to the BACP 100.

Arbitration information is needed from both the CACP 110 and the PACP2 108. This information is provided to the main arbiter via arbitration sideband signals. FIG. 5 is a table showing one manner in which these signals may be multiplexed.

The BURST# input to the CACP 110 provides the means for a MC-A, already in control of the standard I/O bus and capable of bursting information over the bus, to indicate that it is ready to perform a burst operation (more than one transfer of data over the standard I/O bus). The CACP 110 responds to this request by maintaining control of the standard I/O bus in a grant mode for the bursting I/O device until all of the multiple transfers of data have been completed over the standard I/O bus. Upon completion of the burst transfer over the standard I/O bus, the I/O device deactivates the BURST# request line, and the CACP determines that the I/O device is off the bus and begins the next arbitration cycle. In non-burst transfer situations, the CACP 110 determines that the I/O device is off the bus when an end-of-transfer is indicated on the S0/S1#, BURST# and CMD# inputs to the CACP. Once granted, the CACP communicates to the DACP that it wishes to retain ownership of the PCI bus on behalf of the I/O device by keeping the BRIDGE_REQ# signal active. Upon determining that the end-of-transfer has occurred, the CACP will deactivate BRIDGE_REQ# for a minimum of two clocks to indicate to the DACP that the current data transfer has completed. (The direct-attached MC-A device support portion 106 determines that a peripheral I/O device has completed a data transfer via the DCHNLACT input.)

Accordingly, the preferred embodiment of arbitration logic for a multiple bus computer system including a high performance bus such as a PCI bus has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. An information processing system, comprising:
   a central processing unit (CPU);
   a first system bus which connects said CPU to a system memory so that said CPU can read data from, and write data to, said system memory;
   a second system bus connected to said CPU;
   a host bridge connecting said second system bus to a peripheral bus, said peripheral bus having at least one peripheral device attached thereto;
   an input/output (I/O) bridge connecting said peripheral bus to a standard I/O bus, said standard I/O bus provided with a connector to which may be attached a plurality of standard I/O devices each of which corresponds to an individual I/O bus location; and
   bi-level arbitration logic electrically connected to said second system bus, said bi-level arbitration logic comprising (i) a first level of logic for performing arbitration on said I/O bus, wherein one of said individual I/O bus locations is selected from a plurality of said individual I/O bus locations competing for access to said standard I/O bus, and (ii) a second level of logic for arbitrating between said selected individual I/O bus location, said CPU and said at least one peripheral device, wherein one of said selected individual I/O bus location, said CPU and said at least one peripheral device is selected to access said peripheral bus; and
   wherein said bi-level arbitration logic includes sideband signals directly connecting said first and second levels of arbitration logic, said sideband signals including arbitration identification information corresponding to said selected individual I/O bus location.

2. The system of claim 1, wherein said peripheral bus conforms to Peripheral Component Interconnect (PCI) architecture.

3. The system of claim 2 wherein said first level of arbitration logic is implemented on said I/O bridge, and said second level of arbitration logic resides on said second system bus.

4. The system of claim 2, further comprising:
   an I/O controller residing on said second system bus and connecting said second system bus to a peripheral I/O bus; and
   a plurality of peripheral I/O devices attached to said peripheral I/O bus; and
   wherein said second level of arbitration logic arbitrates between a plurality of peripheral I/O devices competing for access to said peripheral I/O bus, said selected individual I/O bus location, said at least one peripheral device, and said CPU, for access to said peripheral bus.

5. The system of claim 4, wherein said peripheral I/O conforms to the IBM ® AT ® architecture 6. The system of claim 4, wherein:
   said first level of arbitration logic also arbitrates between a plurality of peripheral devices competing for access to said peripheral bus and selects one of said competing peripheral devices;
   said second level of arbitration logic arbitrates between said plurality of peripheral I/O devices competing for access to said peripheral I/O bus, said selected individual I/O bus location, said selected peripheral device, and said CPU, for access to said peripheral bus; and
   wherein said sideband signals also include arbitration identification information corresponding to said selected peripheral device.

7. The system of claim 6, wherein said second level of arbitration logic is divided into at least two arbitration control point banks, (i) a first bank for arbitrating between said plurality of peripheral I/O devices competing for access to said peripheral I/O bus, and said selected individual I/O bus location, and (ii) a second bank for arbitrating between said selected peripheral device and said CPU, and wherein said second bank maintains a higher priority level within said arbitration logic.

8. The system of claim 2, wherein said peripheral bus and said second system bus have data widths of at least 32 bits.

9. The system of claim 2, wherein said standard I/O bus conforms to MICROCHANNEL ® architecture.

10. The system of claim 2, wherein said standard I/O bus conforms to ISA architecture.

11. An arbitration mechanism for use in a computer system which comprises (i) a central processing unit (CPU); (ii) a first system bus which connects said CPU to a system memory so that said CPU can read data from, and write data to, said system memory; (iii) a second system bus connected to said CPU; (iv) a host bridge connecting said second system bus to a peripheral bus, said peripheral bus having at least one peripheral device attached thereto; and (v) an input/output (I/O) bridge connecting said peripheral bus to a standard I/O bus, said standard I/O bus provided with a connector to which may be attached a plurality of standard I/O devices each of which corresponds to an individual I/O bus location, said arbitration mechanism being electrically connected to said second system bus and comprising:

(i) a first level of logic for performing arbitration on said I/O bus, wherein one of said individual I/O bus locations is selected from a plurality of said individual I/O bus locations competing for access to said standard I/O bus, and (ii) a second level of logic for arbitrating between said selected individual I/O bus location, said CPU and said at least one peripheral device, wherein one of said selected individual I/O bus location, said CPU and said at least one peripheral device is selected to access said peripheral bus; and wherein said arbitration mechanism includes sideband signals directly connecting said first and second levels of arbitration logic, said sideband signals including arbitration identification information corresponding to said selected individual I/O bus location.

12. The arbitration mechanism of claim 11, wherein said peripheral bus conforms to Peripheral Component Interconnect (PCI) architecture.

13. The arbitration mechanism of claim 12 wherein said first level of arbitration logic is implemented on said I/O bridge, and said second level of arbitration logic resides on said second system bus.

14. The arbitration mechanism of claim 12, wherein said computer system further comprises (i) an I/O controller residing on said second system bus and connecting said second system bus to a peripheral I/O bus; and (ii) a plurality of peripheral I/O devices attached to said peripheral I/O bus; and wherein said second level of arbitration logic arbitrates between a plurality of peripheral I/O devices competing for access to said peripheral I/O bus, said selected individual I/O bus location, said at least one peripheral device, and said CPU, for access to said peripheral bus.

15. The arbitration mechanism of claim 14, wherein said peripheral I/O bus conforms to the IBM ® AT ® architecture.

16. The arbitration mechanism of claim 14, wherein:
said first level of arbitration logic also arbitrates between a plurality of peripheral devices competing for access to said peripheral bus and selects one of said competing peripheral devices;
said second level of arbitration logic arbitrates between said plurality of peripheral I/O devices competing for access to said peripheral I/O bus, said selected individual I/O bus location, said selected peripheral device, and said CPU, for access to said peripheral bus; and
wherein said sideband signals also include arbitration identification information corresponding to said selected peripheral device.

17. The arbitration mechanism of claim 16, wherein said second level of arbitration logic is divided into at least two arbitration control point banks, (i) a first bank for arbitrating between said plurality of peripheral I/O devices competing for access to said peripheral I/O bus, and said selected individual I/O bus location, and (ii) a second bank for arbitrating between said selected peripheral device and said CPU, and wherein said second bank maintains a higher priority level within said arbitration mechanism.

18. The arbitration mechanism of claim 17, wherein arbitration priorities of said plurality of peripheral I/O devices competing for access to said peripheral I/O bus, said plurality of said individual I/O bus locations competing for access to said standard I/O bus, said CPU and said plurality of peripheral devices competing for access to said peripheral bus are prioritized during initial configuration of the computer system, and wherein said first arbitration control point bank compares the priority of said plurality of peripheral I/O devices competing for access to said peripheral I/O bus with said selected individual I/O bus location using said identification information contained within said sideband signals, and said second arbitration control point bank compares the priority level of said CPU with the priority level of said selected peripheral device using said identification information contained within said sideband signals.

19. The arbitration mechanism of claim 12, wherein said standard I/O bus conforms to MICROCHANNEL ® architecture.

20. The arbitration mechanism of claim 12, wherein said standard I/O bus conforms to ISA architecture.

* * * * *